May 17, 1966    G. CALABRIA    3,251,754
PROCESS AND APPARATUS FOR IMPROVING THE RESISTANCE OF POROUS
REFRACTORY MATERIALS TO CORROSIVE ACTION
Original Filed Dec. 31, 1957
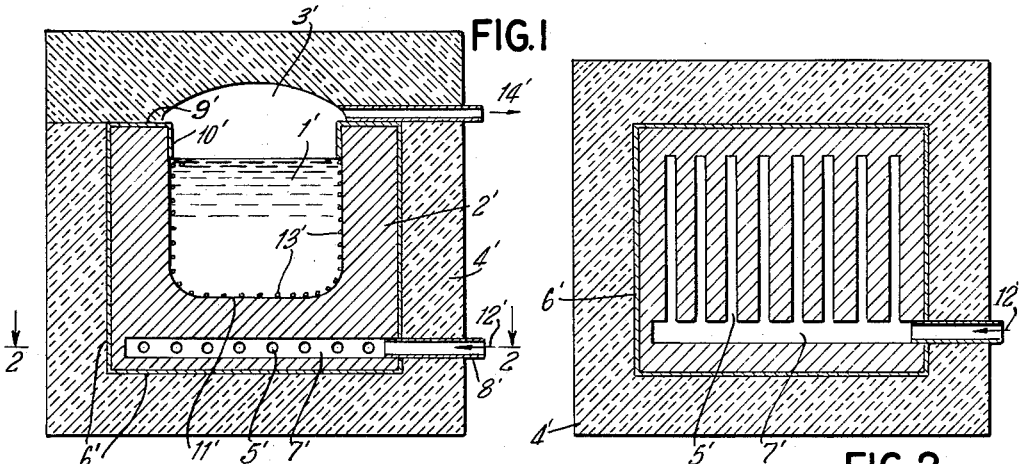
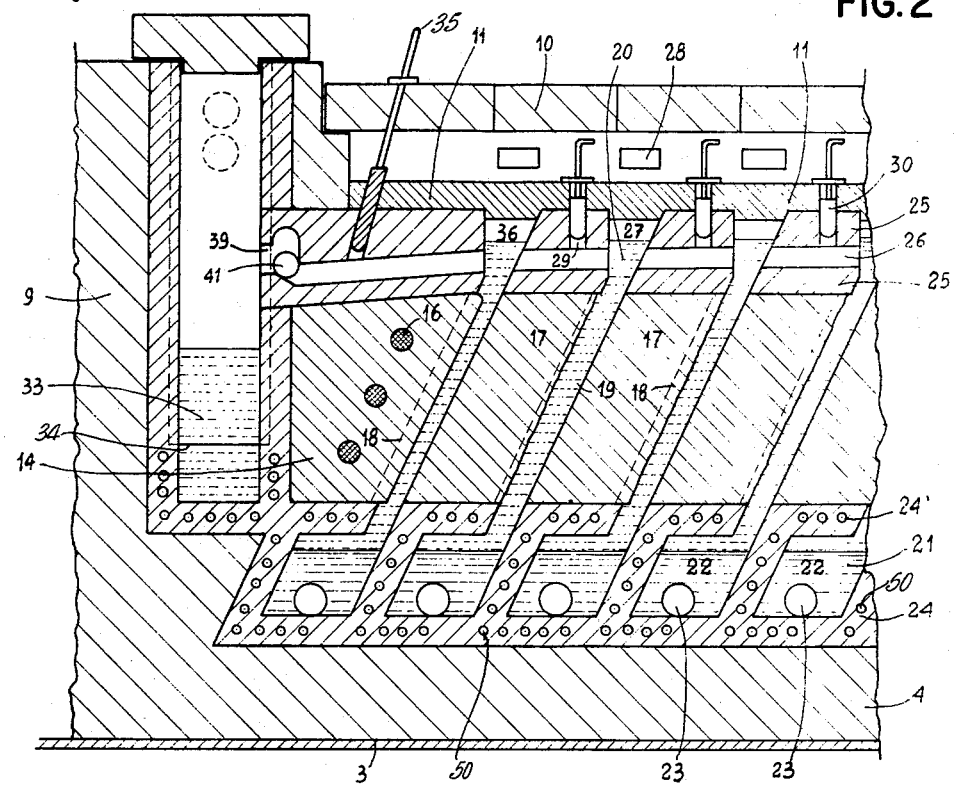

United States Patent Office 3,251,754
Patented May 17, 1966

3,251,754
PROCESS AND APPARATUS FOR IMPROVING THE RESISTANCE OF POROUS REFRACTORY MATERIALS TO CORROSIVE ACTION
Gerolamo Calabria, Milan, Italy, assignor of one-half to Montecatini Societa Generale per l'Industria Mineraria e Chimica, Milan, Italy, and one-half to Giuseppe de Varda, Milan, Italy
Continuation of application Ser. No. 706,381, Dec. 31, 1957. This application Sept. 9, 1963, Ser. No. 307,745
Claims priority, application Italy, Jan. 5, 1957, 161/57
13 Claims. (Cl. 204—67)

This application is a continuation of my copending application Serial No. 706,381, filed December 31, 1957, now abandoned.

This invention relates to a process and means for improving the resistance of porous refractory materials to disintegration by making them relatively impermeable to hot corrosive liquids or molten substances. More particularly, the invention relates to porous materials that are immersed in or contain liquids or penetrative wetting materials that ordinarily exert a corrosive action upon them. For example, the materials may form building materials or liners for crucibles and furnaces, employing liquids or hot molten liquids at elevated temperatures. A special field of application is in the refractory liner of electrolysis furnaces employing high temperature molten baths such as cryolite.

Difficulties are encountered when designing apparatus, such as furnaces and crucibles, for handling or processing molten metals and salts at elevated temperatures. In many situations the possibility of chemical attack or of combustion, and the requirements with respect to electrical and heat conductivity, exclude the use of highly impermeable materials such as metals, graphite or carbon. In lieu thereof, special materials are resorted to, such as metal oxides or other metal compounds. Because of their very high melting points, difficulties are encountered in shaping the latter mechanically. Because of their mechanical strength and heat resistance they usually cannot be initially obtained in the desired shape and size. They must ordinarily be utilized in the form of conglomerates, or as sintered or pressed masses, and often in conjunction with binders. Consequently, these materials possess relatively high porosity.

If such bonded material is brought in contact with a low viscosity liquid which wets, and also penetrates into the pores of the material, because of high static pressure head and capillary forces, the liquid starts to destroy the binder. The surface or superficial area subject to attack is enormously increased, being in the pores. Even a material which, if it were in impermeable form, would offer sufficient chemical resistance to the liquid, rapidly disintegrates when it becomes impregnated with the liquid.

Numerous attempts have been made to reduce the porosity of the materials by means of improvements in the granulation using higher compression when making these materials, and by other expedients, but in most cases satisfactory results have not been attained. Thus, it is well known that corresponding technological difficulties are encountered in a number of chemical and electrochemical processes, due to the lack of suitable materials for crucibles. An important instance is in the processes for the electrolytic production of aluminum in cells made from or lined with non-conductive material.

I have now found that, if a preferably inert gas, that is, a gas which does not react with the liquid processing material, such as, for instance, nitrogen, carbon oxides such as carbon monoxide and dioxide, or helium, is introduced into the interstices of a porous material, such as in the refractory liner of an electrolytic cell, in such a way as to create therein a static or dynamic pressure distribution or gradient causing gas leakage towards the process liquid or, preferably, a quasi-pressure equilibrium at the contact surface, the process liquid cannot penetrate into the interstices, and the cell becomes practically impermeable to the liquid. The region of chemical attack is confined to the common surface area between the material and the process liquid and, consequently, the degree of attack is in many cases negligible.

Moreover, I have found that the material into which the gas is blown should preferably have a structure wherein the cross-sectional size of the open interstices is as uniform as possible. In some cases, such as in electrolysis of alumina, I found that it is particularly advantageous to resort to a pre-treatment of the material, for instance by soaking the material with pitch which is subsequently cokified by heating in inert atmosphere, as described in the copending U.S. patent application of De Varda, Serial No. 705,374, filed December 26, 1957, now U.S. Patent 2,952,605, whereby the interstices originally present are subdivided into interstices of uniform size.

Although the herein-claimed process is particularly adapted for operation with liquids at elevated temperatures it is equally applicable without any modification at low temperature. It also has application to apparatus containing or processing hot or cold resins or viscous masses.

Where the material in question forms upwardly extending vertical or inclined walls, the protecting action can be enhanced, if there are no other reasons excluding this possibility, by increasing the quantity of gas injected into the material so that the rising excess gas covers the wall and forms a veil which further limits the contact between the liquid and the porous wall material.

The gas may be preheated to avoid the cooling down of the liquid; moreover, it may be collected in a chamber above the surface of the liquid, withdrawn by a suction pump (not shown), re-compressed at the outside, and fed back in a closed cycle, to eliminate waste of heat. It is also possible to utilize the gases given off by the liquid as a consequence of the processes in which the liquid participates.

The drawings and examples illustrate preferred embodiments.

FIG. 1 is a vertical section of an apparatus which is utilizable as a crucible or as a chemical, electrolytic, or metallurgical furnace, employing a molten body of liquid or viscous material in contact with a refractory liner or containing vessel;

FIG. 2 is a horizontal section at 2—2 of FIG. 1;

FIG. 3 is a vertical section, taken lengthwise, of a multicell furnace employed for producing aluminum by electrolysis of alumina in a fluorinated salt bath, such as cryolite.

*Example*

FIG. 1 represents, in vertical section, a melting furnace, or crucible, or a cell for electrolysis of fused salts according to conventional methods. The molten salt 1' is contained in a vat 2' of a rammed or compacted mass, or a brickwork, of refractory material, such as MgO, slightly attackable by the fused salt, and of limited porosity, e.g.

having not higher than 15% of voids, and treated so as to ensure sufficient uniformity of dimensions of the pores. Heating is effected by conventional means (not shown) positioned in the top chamber 3', or by passage of current through the fused salts, or in any other manner known. The vat is heat-insulated by material 4'.

According to a preferred form of the present invention, a series of holes or small secondary channels 5' are provided or formed, extending perpendicularly to the plane of the figure, in the thickness direction of the wall of the vat. The holes or channels do not reach the surface of the vat 6', neither the external nor the internal surface. They communicate with one another through a collector 7' extending through the insulating material, into which collector a tube 8' opens. The system of holes may be varied with respect to shape, dimensions, and paths, for adaptation to the size and characteristics of the vat and of the liquid. Collector 7' comprises a lined or unlined channel formed or provided in the refractory wall of the vat.

It is desirable to impermeabilize the whole external surface 6' of the vat, and, insofar as this is possible in practice, also the surface 9' under the cover and the portions 10' of the internal surface not reached by the liquid. This is accomplished by means of metallic coatings, metallizations, applications or formation of impermeabilizing layers, etc. These external impermeabilizing means, known per se, are designed only to resist temperature and not the action of the fused salt. The degree of impermeabilization must not or need not be absolute, since its purpose is to reduce gas consumption and heat losses.

If the material of the vat is MgO, for example, and the temperature of the bath does not surpass 950° C., the following external impermeabilizing means may be employed: potassium metaborate, calcium and potassium sulfate, potassium metasilicate, and potassium disilicate. They are applied by conventional dipping, spraying, or other methods.

Inert gas is introduced at 12', for instance nitrogen, and the pressure is adjusted so as to balance or to be slightly higher than the pressure resulting from the static liquid pressure head, and from the effect of capillarity, in correspondence with the bottom 11' of the vat. Said value varies according to the dimensions of the crucible or cell, the height and characteristics of the fused salt bath, the delivery and distance of the secondary small channels from the liquid, the characteristics of the refractory, the dimensions of the pores, which are smaller than 50 microns, and preferably smaller than 20 microns, etc. Said pressure is usually between 1.5 and 3.00 atmospheres. Under these conditions, on the bath surface 11', the formation of a liquid meniscus in equilibrium takes place in general correspondence with every pore. Or there takes place the detaching, in slow rhythm, or sequence, of a series of small gas bubbles 13'. Thus the penetration of the liquid is prevented. As the free level of the liquid is approached, the pressure head diminishes on the lateral surface and, therefore, the passage of gas 13' tends to increase as it is evolved from the liquid along the internal walls. Since, however, said passage causes pressure drop through the capillary paths of the walls, which paths increase in length the farther they are from the bottom, a self-adjusting action results which limits the overall quantity of gas needed. The gas that evolves from the liquid leaves the top chamber through the pipe 14'.

In the case of an electrolysis cell employed for production of aluminum, it is possible to create a zone of static equilibrium on the bottom of the chamber collecting the aluminum. It is of little importance whether it coincides accurately with the geometrical bottom of said chamber or not, since the metal does not penetrate at any significant rate into the MgO refractory walls. On the walls that are in direct contact with the fluorinated bath it is possible, on the contrary to provide convenient distribution by means of channels, in dynamic equilibrium with the effluent gas leaving the pores of the walls and moving towards the said bath.

The path of the gas in the bath runs predominantly along the side walls of the cell, that is, in practice, along the longitudinal walls in the multicell furnace described, for example in the G. de Varda applications Serial No. 587,985, filed May 29, 1956, and Serial No. 705,374, filed December 26, 1957, now U.S. Patents 2,952,592 and 2,952,605, respectively, where they do not interfere with the electrolysis. The bubbles that evolve on the transverse walls, that is the walls incorporating and supporting the bipolar electrodes of electrodic carbon, rise along the anodic surface together with those of the gas evolved by electrolysis and, therefore, no alteration of the operation of the multicell furnace as provided in the cited applications is involved. This is illustrated in FIG. 3 in which the gas is introduced through laterally extending channels 50 formed in the upwardly extending porous MgO refractory partitions 24', and also in the horizontally extending portions. The multicell apparatus shown in FIG. 3 is that found in copending application Serial No. 587,985. Aluminum is produced by electrolyzing alumina in a bath of molten cryolite at 950° to 1000° C. Electric current is passed from terminals 16, in carbonaceous anode 14 through the renewable layer of electrochemically consumable carbon 18, then through the first electrolysis gap 19, the first bipolar electrode 17, and so on, serially through the cells, the current then passing to right terminal conductors not shown. The molten cryolite flows in the opposite direction from one electrolysis gap to the next, in a closed circuit, through channels 26 in MgO refractory blocks 25. Channels 26 are provided with adjustable plugs or valves 30. Gas porous plates 11 of heat insulating or ceramic material bridge the gas spaces 27, 36, above the gaps. Gas evolved in the process is vented at 28. Outer cover lids 10 are provided. The molten bath flows through passage 39 into lower chamber 33, from which it is lifted, by gas pressure or by other means, into a second chamber 34. Liners 4 and 9 are of refractory and/or heat insulating material, and an outer metal sheathings is indicated at 3. Molten aluminum produced in the process is removed from collecting chambers 22, through ducts 23.

The impermeabilizing improvement described in G. de Varda copending application Serial No. 705,374 comprises a furnace for producing aluminum by electrolysis of alumina in molten cryolite, the furnace having one or more refractory structural elements contacting the molten bath, the element or elements comprising magnesium oxide refractory material the susceptibility to attack and the porosity of which has been substantially decreased by cokified carbonaceous material present in the pores thereof, the electrical resistivity of the cokified refractory being still higher than the resistivity of the electrolytic melt, the cokified refractory region containing in its pores from 1 to 6% of weight of subdivided coke, the said element being made by a process characterized in that the refractory is impregnated with a cokifiable organic substance comprising fused pitch, the refractory so impregnated being subjected to subsequent cokifying heat treatment, the operating cycle of steps being repeated from 2 to 5 times.

The process is applicable to other refractories, such as silicon nitride bonded silicon carbide, as well as other commercially available refractories employed in contact with chemically agressive fluids.

I claim:

1. An apparatus for containing a body of hot chemically aggressive liquid comprising molten cryolite, said apparatus comprising container means including a porous refractory element comprising magnesium oxide having not more than about 15% voids and provided with an external surface and having an internal surface adapted to contact and to contain said liquid, said refractory element extending at least in part upwardly-downwardly said element defining pores distributed therein substantially uniform in volume and not larger than about 50 microns in maximum cross sectional dimension, said refractory element having deposits of cokified carbonaceous material in said pores thereof, means forming a series of gas porous channels extending within said refractory element and located only in the lower portion of said container means, each of said channels terminating before the respective external and internal surfaces of said element and communicating with at least some of said pores, collector means within said refractory element joining said channels to each other, and conduit means extending outside of said container means and connected to said collector means for feeding to said channels a gas inert to said liquid, whereby said gas passes into said channels and through said pores toward said internal surface to diminish impregnation of and attack of said internal surface by said liquid.

2. Apparatus according to claim 1, said refractory element being provided on at least said internal surface thereof not in contact with said liquid with an impermeabilizing coating of a material selected from the group consisting of potassium metaborate, calcium sulfate, potassium sulfate, potassium metasilicate, and potassium disilicate.

3. A furnace for production of aluminum by electrolysis of alumina in a fused fluorinated salt bath, comprising juxtaposed anode and cathode means, container means including a porous refractory element comprising magnesium oxide having not more than about 15% voids and provided with an external surface and having an internal surface adapted to contact and to contain said salt bath, said refractory element defining pores distributed therein substantially uniform in volume and not larger than about 50 microns in maximum cross sectional dimension, said refractory element having deposits of cokified carbonaceous material in said pores thereof, means forming a series of gas porous channels extending within said refractory element and located only in the lower portion of said container means, each of said channels terminating before the respective external and internal surfaces of said element and communicating with at least some of said pores, collector means within said refractory element joining said channels to each other, and conduit means extending outside of said container means and connected to said collector means for feeding to said channels a gas inert to said salt bath, whereby said gas passes into said channels and through said pores toward said internal surface to diminish impregnation of and attack of said internal surface by said salt bath.

4. An apparatus for contacting and containing a body of chemically aggressive liquid, comprising containing vessel means including a bottom wall and upwardly-downwardly extending lateral walls having internal surfaces adapted to contact said liquid, said bottom and lateral walls being formed of a porous refractory body comprising magnesium oxide, said bottom and lateral walls defining pores distributed therein substantially uniform in voulme and not larger than about 50 microns in maximum cross sectional dimension, said refractory element having deposits of cokified carbonaceous material in said pores thereof, means forming a series of gas porous channels in said bottom wall and in the lower portion of said lateral side walls, collector means within said containing vessel means joining said channels to each other, and conduit means extending outside of said vessel means and connected to said collector means for feeding to said channels a gas inert to said liquid, and a gas pressure relief conduit extending from within said vessel to the outside thereof.

5. In a process for producing aluminum by electrolysis of alumina in a molten cryolite salt bath, in which process the bath is at least in part contained by bottom and lateral porous refractory walls made of compacted granules comprising a porous refractory metal oxide with substantially uniform voids therein of capillary dimensions, the steps of carrying out the electrolysis while forcing carbon monoxide gas into said voids of said refractory at a pressure of between 1.05 and 3 atmospheres but just sufficient to overcome the static liquid pressure of said bath so as to create a quasi pressure equilibrium at the liquid-refractory contact surface between said salt bath and a respective refractory wall and to form a veil of said gas along said wall.

6. A method of diminishing the attack on the internal surface of a containing vessel comprised of a body of porous refractory material defining pores of uniform capillary size therein, by a liquid in contact with said vessel and contained thereby, comprising the steps of introducing into a lower portion of said body a gas which is inert to the body and to said liquid at a pressure of between 1.05 and 3 atmospheres sufficient to establish a gas pressure equilibrium between the gas in said pores and the static pressure of said liquid at the bottom and lateral faces of the vessel so as to diminish impregnation of the refractory material by said liquid, and conducting said gas through said pores of said material at a pressure differential at each level and sufficient at each level of said vessel to substantially obstruct the passage of the liquid at that level from the liquid-refractory interface into the interior of the refractory material.

7. A process of diminishing attack on the internal surface of a porous container body by a molten salt contained therein, said container body being comprised of integrated particles of refractory material, comprising the steps of introducing and cokifying carbonaceous material in the pores of the refractory body to establish free spaces in said pores of substantially uniform volume and having a cross-sectional dimension not larger than about 50 microns, introducing into the lower region of said container body a gas which is inert to the molten salt and conducting said gas through said free spaces, the pressure of said gas being different at each level and sufficient to counterbalance the static pressure of said molten force at each level of the molten salt in said container body, and maintaining the gas pressure so that it is sufficient at each level of the container body to substantially obstruct the passage of the liquid at that level from passing through the liquid-refractory interface into the interior of the refractory body.

8. In a process for producing aluminum by electrolysis of alumina in a molten salt bath comprised of cryolite contained within a porous refractory vessel comprising magnesium oxide having not more than about 15% voids and defining pores distributed therein substantially uniform in volume and not larger than about 50 microns in maximum cross-sectional dimension in contact with said molten salt bath, the steps of carrying out the electrolysis while simultaneously passing a gas inert to said salt bath through and within said pores of the refractory vessel under a pressure sufficient to approximately counterbalance the static pressure of said molten salt bath, in order to diminish impregnation of the refractory vessel by said bath.

9. The process of claim 8 in which said gas is nitrogen.

10. The process of claim 8 in which said gas is helium.

11. The process of claim 8 in which said gas is carbon dioxide.

12. In a furnace process for producing aluminum by electrolysis of alumina in a molten salt bath comprised of cryolite, in which process said bath is at least in part contained by porous refractory walls comprising compacted granules of magnesium oxide, the steps comprising carrying out the electrolysis while simultaneously forcing a gas into the pores of said refractory walls at a pressure sufficient to just counter-balance the static liquid pressure of said bath and to form a veil of rising excess gas to limit the contact between said liquid bath and said refractory walls.

13. The process of claim 12, said gas being introduced at a pressure of between about 1.05 and 3 atmospheres.

References Cited by the Examiner
UNITED STATES PATENTS 2,339,192  1/1944  Roberson _____ 266—32 X
2,871,008  1/1959  Spire _____ 266—39

JOHN H. MACK, *Primary Examiner.*
WINSTON A. DOUGLAS, *Examiner.*
H. S. WILLIAMS, *Assistant Examiner.*